Figure 1:
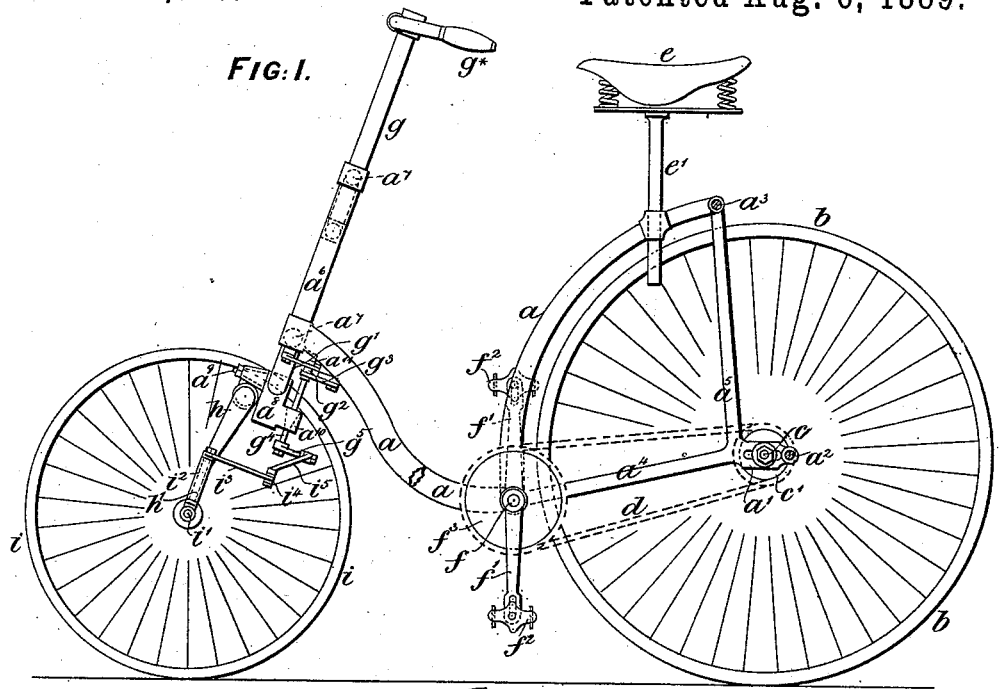

(No Model.) 2 Sheets—Sheet 1.

W. PHILLIPS & R. W. SMITH.
VELOCIPEDE.

No. 408,516. Patented Aug. 6, 1889.

Attest:
E. Arthur
W. E. Knight

Inventors:
Walter Phillips,
Robert Walker Smith,
by Knight Bros.
attys.

(No Model.) 2 Sheets—Sheet 2.
W. PHILLIPS & R. W. SMITH.
VELOCIPEDE.
No. 408,516. Patented Aug. 6, 1889.
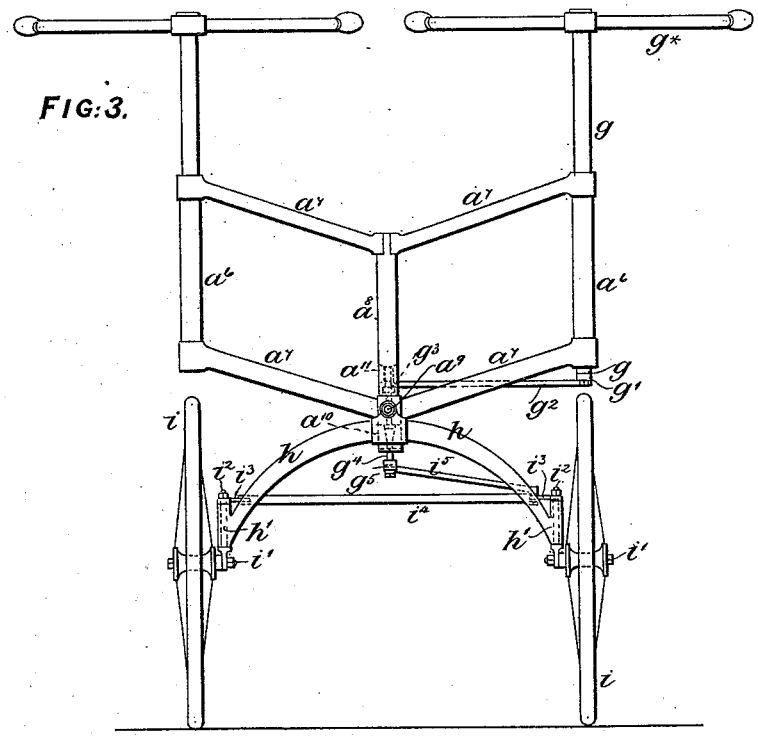
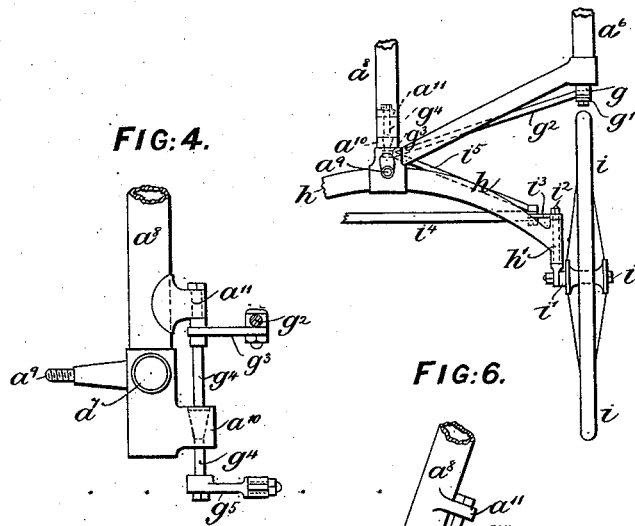
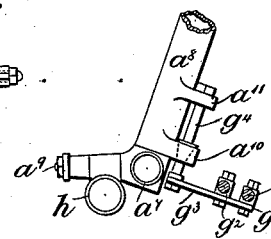

UNITED STATES PATENT OFFICE.

WALTER PHILLIPS AND ROBERT WALKER SMITH, OF COVENTRY, COUNTY OF WARWICK, ENGLAND.

VELOCIPEDE.

SPECIFICATION forming part of Letters Patent No. 408,516, dated August 6, 1889.

Application filed April 10, 1889. Serial No. 306,648. (No model.)

*To all whom it may concern:*

Be it known that we, WALTER PHILLIPS, manager to the Rudge Cycle Company, (Limited,) and ROBERT WALKER SMITH, machinist, subjects of the Queen of Great Britain, both residing at Coventry, in the county of Warwick, England, have invented new and useful Improvements in Velocipedes, of which the following is a specification.

Our invention relates to that class of velocipedes in which the riders sit side by side, each over or in line with a wheel, and known as "sociables."

Heretofore some sociables have been formed by combining two rear-driven "safety" bicycles and others have been constructed with three wheels, the front wheel being the steering-wheel; but these arrangements have been more or less defective and have consequently been unsuccessful when brought into practical use; and the object of our invention is to obviate these defects.

In carrying our invention into effect, we mount each of the rear wheels upon a short axle, and upon the hub of each wheel is fixed a chain-wheel, such short axle being carried by a slotted bracket from the frame to allow of adjustment for regulating the tension of the chain. Each of the saddles is supported at the upper part of a backbone or frame, which is curved to the form of the wheel, and the two frames are connected together and braced near their upper part by a cross tube or tie, the brackets carrying the axles being connected together in a similar manner. Each pedal-axle is mounted in bearings at the lower end of the curved backbone, and has fixed thereon a chain-wheel, from which a chain leads to the chain-wheel upon the hub of one of the rear wheels. From each of the pedal-axles the frame is curved slightly inward, and is continued rearward until it joins the bracket of the corresponding rear wheel, and it then rises vertically until it joins the upper end of the curved backbone. The frames are each continued forward until they join a corresponding vertical pillar, through one or both of which passes a steering-spindle. These tubular pillars are, at about the middle of their length and at their lower end, connected rigidly together by means of two cross ties or frames, inclined downward toward their center, where they are rigidly connected to the top and bottom, respectively, of a short central vertical pillar, which carries a horizontal stud or axis, upon which the cross-frame of the front and steering wheels is mounted. The front cross-frame is preferably arched, and is provided at its ends with bearings for short vertical spindles which carry the axles of the wheels, and the upper end of each of these vertical spindles has fixed thereon a short lever, which levers are coupled by means of a connecting-link. One of these levers or the connecting-link is by a connecting-rod pin-jointed thereto and connected by a flexible joint with a lever fixed upon a vertical spindle supported in bearings in or carried by the short vertical pillar, and the upper part of this vertical spindle is provided with an offset or lever, which is by a connecting-rod connected to a similar offset fixed upon the lower end of a steering-spindle provided with the usual steering-bar at its upper part; or, if desired, both of the steering-bars may, through spindles, be similarly connected with the wheels, thus enabling both riders or either rider to steer. If desired, the connecting-rods may both be connected to one lever or offset from the central spindle.

In order that the said invention may be more clearly understood and readily carried into effect, we will proceed, aided by the accompanying drawings, more fully to describe the same.

Figure 2:
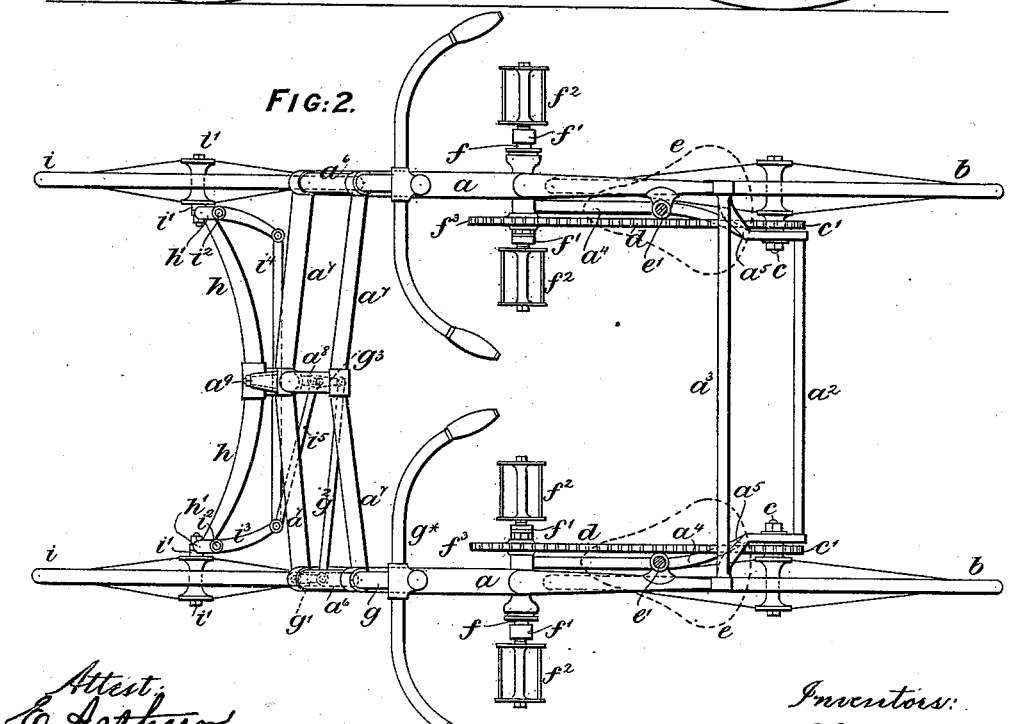

In the drawings, Figure 1 is a side elevation of a velocipede constructed according to our invention, the wheels at one side and some other parts being removed in order more clearly to show the parts. Fig. 2 is a plan thereof. Fig. 3 is an end view of the front part thereof arranged in a vertical position. Fig. 4 is a detail view of part, drawn to an enlarged scale. Fig. 5 is a front view of part of the front of the machine in a vertical position, showing a modification of the connections of the steering mechanism; and Fig. 6 is a side view of a portion thereof in its normal or inclined position and drawn to an enlarged scale.

In the various figures of the drawings like parts are indicated by similar letters of reference.

$a$ represents the longitudinal frame of the machine, and $b$ represents the rear wheels. The rear wheels $b$, which are the driving-wheels, are each mounted upon a short axle $c$, and have each formed or fixed on its hub a chain-wheel $c'$, and such short axle $c$ is carried by a slotted bracket or extension $a'$ of the frame $a$, in order to allow of adjustment for regulating the tension of the chain $d$.

Each of the saddles $e$ is supported upon an adjustable pillar $e'$ at the upper part of that part of the backbone or frame $a$ which is curved to the form of the wheel $b$, and these two parts of the frame $a$ are connected together and braced near their upper part by a cross tube or tie $a^3$, the brackets $a'$, carrying the axle $c$, being connected together in a similar manner by a cross tube or tie $a^2$.

Each pedal-axle $f$ is mounted in bearings at the lower end of the curved backbone, and has fixed thereon the usual cranks $f'$ and pedals $f^2$, and also a chain-wheel $f^3$, from which the chain $d$ leads to the chain-wheel $c'$ upon the hub of one of the driving-wheels $b$.

From each of the pedal-axles $f$ the part $a^4$ of the frame $a$ is curved slightly inward, and is continued rearward until it joins the bracket or extension $a'$ of the corresponding rear or driving wheel $b$, and it is there formed with a vertical limb $a^5$, which joins the upper end of the curved backbone $a$.

The frames $a$ are each continued forward from the pedal-axles $f$ until they join corresponding vertical pillars $a^6$, through one of which passes a steering-spindle $g$. These tubular pillars $a^6$ are, at about the middle of their length and at their lower ends, connected rigidly together by means of two cross ties or frames $a^7$, inclined downward toward their center, where they are rigidly connected to the top and bottom, respectively, of a short central vertical pillar $a^8$, which carries a horizontal stud or axis $a^9$, upon which the cross-frame $h$ of the front and steering wheels $i$ is detachably mounted, with capability of partially revolving thereon in order to enable the wheels $i$ to follow the inequalities of the road in a manner similar to that described by us with respect to a tandem velocipede in the specification of English Letters Patent granted to us and dated the 8th day of October, 1888, No. 14,427.

The front cross-frame $h$ is preferably arched, and is provided at its ends with bearings $h'$ for short vertical spindles $i^2$, which carry the axles $i'$ of the wheels $i$, and the upper end of each of these vertical spindles $i^2$ has fixed thereon a short lever or offset $i^3$, which levers are coupled by means of a connecting-link $i^4$, pin-jointed thereto at each end thereof. One of these levers $i^3$, or the connecting-link $i^4$, is, by a connecting-rod $i^5$ at one end thereof, pin-jointed thereto, and at the other end jointed, by a flexible joint, to a lever $g^5$, fixed upon a vertical spindle $g^4$, which is supported in bearings $a^{10}$ $a^{11}$, carried by the short vertical pillar $a^8$, or it might be supported in bearings within such short vertical pillar; and the upper part of this vertical spindle $g^4$ is provided with an offset or lever $g^3$, which is, by a connecting-rod $g^2$, connected to a similar offset or lever $g'$, fixed upon the lower end of the steering-spindle $g$, which is provided with the usual steering-bar $g^*$ at its upper end.

In the modification represented at Figs. 5 and 6 the separate lever $g^3$ is dispensed with and the connecting-rods $g^2$ $i^5$ are both connected by flexible joints at different points to one lever $g^3$ $g^5$.

If desired, both of the steering-bars may, through spindles $g$, be similarly connected with the wheels $i$, thus enabling both riders or either rider to steer.

By this construction of sociable velocipede we obtain a safe and swift machine, and any tendency to the skidding of the wheels, even when the machine is being driven by only one of the riders, is obviated.

We are aware that some of the details of construction herein shown and described have been employed in other classes of velocipedes than that to which our invention relates, and we therefore do not claim such details, separately considered.

Having now particularly described and ascertained the nature of our said invention and in what manner the same is to be performed, we declare that what we claim is—

1. In a velocipede of the sociable class, the framing constructed with longitudinal frames $a$ $a^4$ $a^5$, the parts $a$ extending rearwardly and upwardly, parts $a^4$ rearwardly, and the parts $a^5$ extending vertically and connecting the rear ends of parts $a$ and $a^4$, cross-pieces $a^2$ and $a^3$, steering-pillars $a^6$, cross-frames $a^7$, connecting them, central vertical pillar $a^8$, and front cross-frame $h$, supported by the latter, for carrying the front wheels, the frames $a$, $a^4$, and $a^5$ carrying the back wheels, substantially as shown and described.

2. The side frames of a velocipede of the sociable class, consisting of backbones $a$, rearwardly-extending parts $a^4$, curved inwardly, vertical limbs $a^5$, connecting the rear ends of parts $a$ and $a^4$, and brackets $a'$, at the juncture of parts $a^4$ and $a^5$, in which the axles of the rear wheels are journaled, substantially as set forth.

3. In combination with the frame and wheels of a velocipede of the sociable class, the steering or front portion of the same consisting of side pillars $a^6$, to receive the steering spindle or spindles, a central pillar $a^8$, frame $a^7$, connecting the pillars, and front cross-frame $h$, pivotally connected with the central pillar and carrying the front wheels, substantially as set forth.

4. A four-wheeled two-track velocipede of the sociable class, constructed with longitudinal frames $a$ $a^4$ $a^5$, connected together by cross-frames $a^2$ $a^3$ $a^7$ $a^7$ $a^8$ and supporting-saddles $e$, over or in line or nearly in line with the wheels $b$, chain-wheels $f^3$, receiving motion from pedal-cranks $f'$, and communicating motion by chains $d$ to chain-wheels $c'$, fixed on the hubs of the driving-wheels $b$, front cross-frame $h$, carrying the steering-wheels $i$ and mounted upon a horizontal axis $a^9$, carried by the central vertical pillar $a^8$, such steering-wheels receiving the necessary steering movement through handle-bar $g^*$, steering-spindle $g$, lever $g'$, connecting-rod $g^2$, lever or levers $g^3$ $g^5$, central vertical spindle $g^4$, and connecting-rods $i^5$ $i^4$, all in manner substantially as herein shown and described.

WALTER PHILLIPS.
ROBERT WALKER SMITH.

Witnesses:
W. B. BROMLEY,
  Queen Victoria Road, Coventry.
EDWN. HITCH,
  Chapel Fields, Coventry.